Aug. 21, 1956
A. A. GRIFFITH
2,759,686
AIRCRAFT AND GAS TURBINE POWER PLANT
INSTALLATIONS THEREFOR
Filed Dec. 2, 1952
2 Sheets-Sheet 2
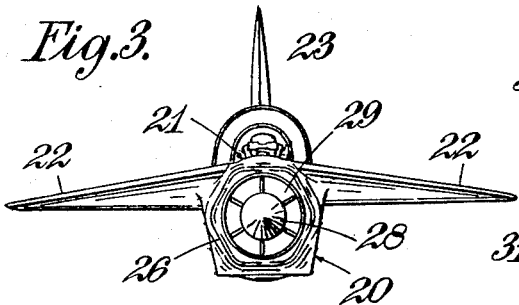
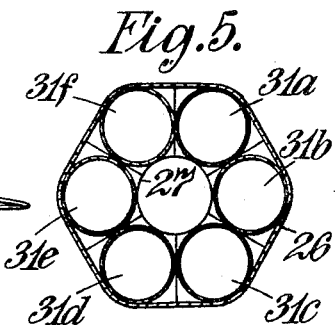
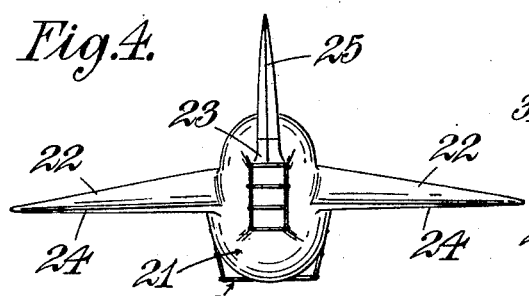
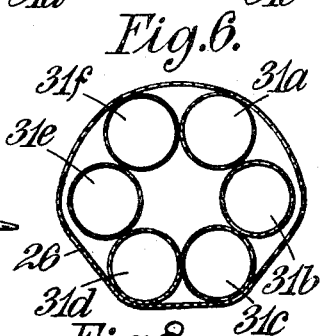
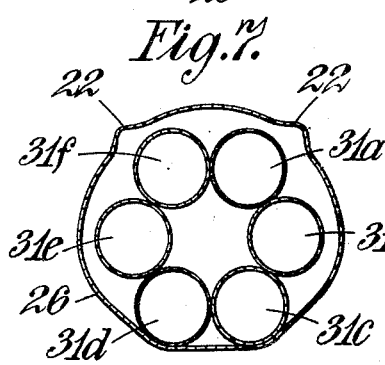
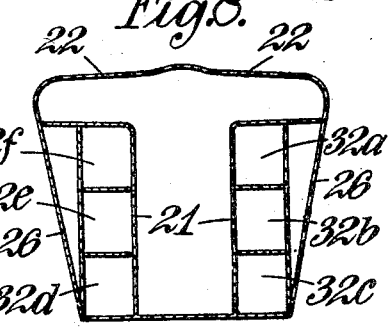
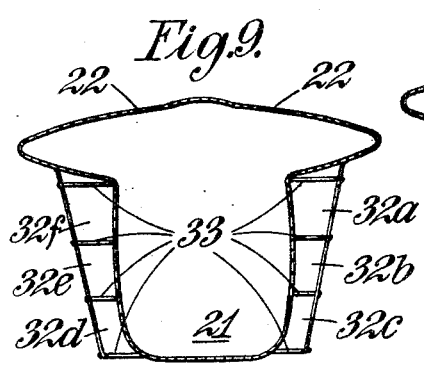
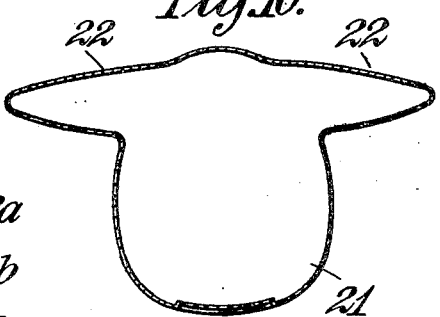
INVENTOR
A. A. GRIFFITH
BY
Wilkinson & Mawhinney
ATTYS.

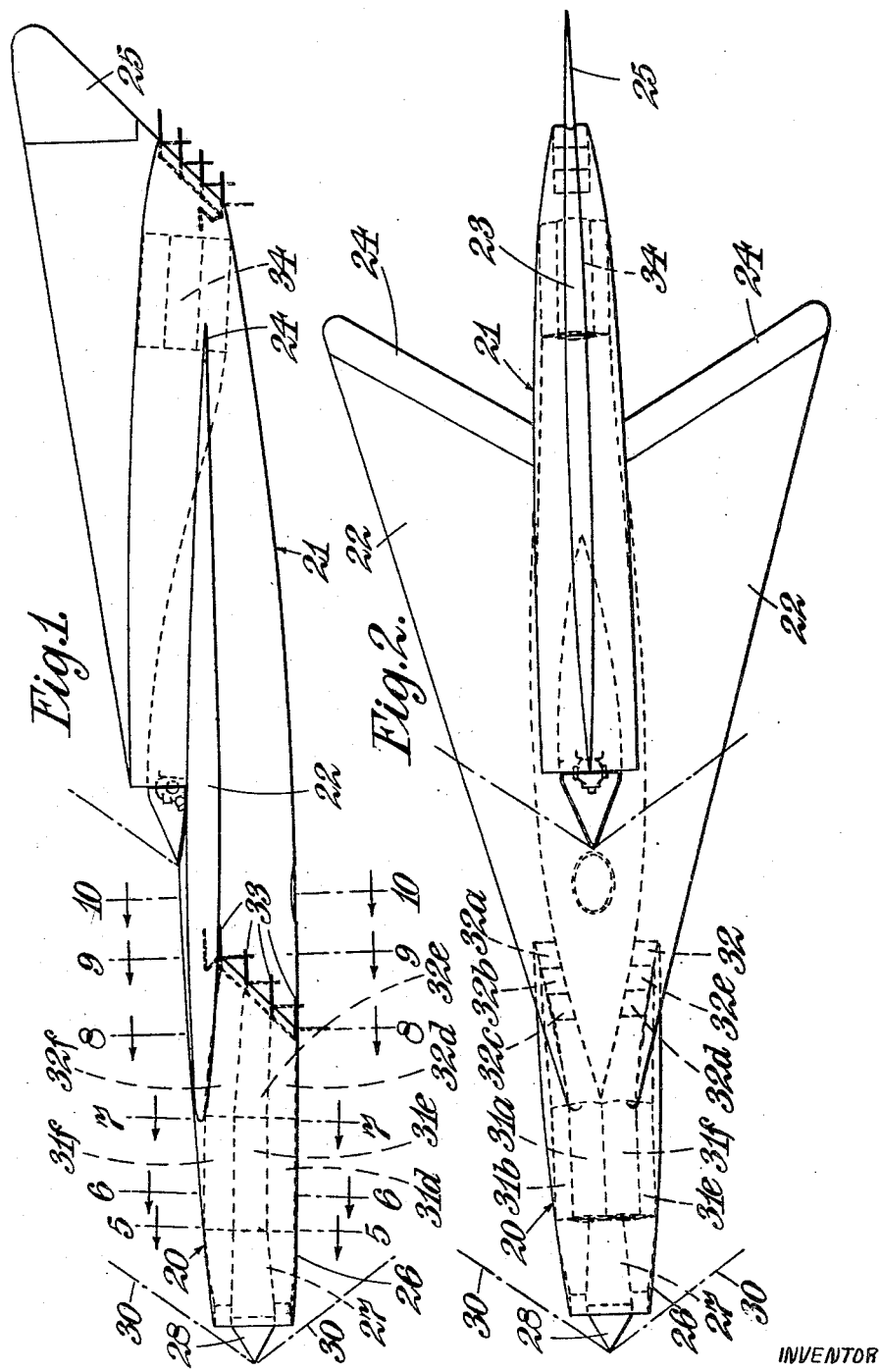

United States Patent Office 2,759,686
Patented Aug. 21, 1956

2,759,686

AIRCRAFT AND GAS TURBINE POWER PLANT INSTALLATIONS THEREFOR

Alan Arnold Griffith, Derby, England, assignor to Rolls-Royce Limited, Derby, England, a British company Application December 2, 1952, Serial No. 323,582

Claims priority, application Great Britain December 5, 1951

7 Claims. (Cl. 244—15)

This invention relates to aircraft and gas turbine power plant installations therefor. The invention has important application in gas-turbine power plant installations of aircraft designed for flight at supersonic speeds but the invention may be used also in aircraft designed for flight at subsonic speeds.

According to the present invention, an aircraft gas turbine power plant installation comprises an air-entry duct structure affording an annular duct with a forwardly-facing inlet, and a plurality of gas turbine reaction propulsion engines arranged in circumferential juxtaposition and rearwardly of said duct and having forward-facing compressor air intakes communicating directly with the annulus of said duct.

In accordance with a further aspect of the invention, an aircraft designed for flight at supersonic speeds comprises a fuselage structure and a gas turbine power plant installation in the fuselage structure, said fuselage structure comprising an outer wall structure of substantially cylindrical form and an inner wall structure which is arranged coaxially within the outer wall structure to form an annular duct and which has a conical extension projecting forwards beyond the outer wall structure, and said gas turbine power plant installation comprising a plurality of gas turbine reaction propulsion engines arranged in circumferential juxtaposition rearwardly of said duct and having forward-facing compressor air intakes communicating directly with the annulus of said duct.

When designing a forward-facing air intake for a gas turbine installation of an aircraft which is to fly at supersonic speeds, it is desirable to provide an inner conical member, the apex of which lies forwards of the intake so as to cause a shock wave formation which extends rearwardly from the apex of the conical member at such an angle as to pass outside the area of the intake. Thus the air intake is annular being defined between the base of the conical member and the forward end of an outer wall of the instake structure, and the invention enables air entering the annular intake to flow rearwardly through the annular duct to enter, without substantial deviation in its flow, the compressors of a plurality of circumferential-juxtaposed engines; thus pressure losses experienced in conveying air to engine compressors are substantially reduced.

According to a further feature of the invention, there are provided two exhaust ducts or two sets of exhaust ducts, one duct or set of ducts lying on each side of the fuselage structure of the aircraft, and a number of the engines are connected to exhaust to atmosphere through the exhaust duct or ducts on one side of the fuselage structure, and the remainder are connected to exhaust to atmosphere through the exhaust duct or ducts on the other side of the fuselage structure. For example, six gas turbine engines may be installed in a ring in the fuselage with their axes substantially parallel and three of said engines may exhaust through a duct or set of ducts on one side of the fuselage structure and the remaining three through a duct or set of ducts on the other side of the fuselage structure.

In accordance with another feature of the invention, adjustable deflector means may be provided at the outlet ends of the exhaust ducts to enable the exhaust gases from one or more engines of the installation to be deflected downwardly with respect to the direction of normal flight to produce a lift force on the aircraft.

One preferred embodiment of the invention as applied in an aircraft designed for flight at supersonic speeds will now be described with reference to the accompanying drawings in which—

Figure 1 is a side elevation of the aircraft,
Figure 2 is a plan view of the aircraft,
Figure 3 is a front view of the aircraft,
Figure 4 is a rear view of the aircraft, and
Figures 5 to 10 are sections on the lines 5—5, 6—6, 7—7, 8—8, 9—9 and 10—10 respectively of Figure 1.

Referring to the drawings, the aircraft comprises a fuselage structure which can be considered to be constituted of two major parts, namely—a forward part 20 in which the power plant is installed and a rearward part 21 affording accommodation for the pilot, fuel tanks, etc., and supporting aerofoil structures, the latter comprising swept-back wings 22 and a vertical fin 23 provided with suitable control surfaces such as ailerons 24 and rudder 25.

The forward fuselage part 20 comprises an outer wall structure 26 of substantially tubular form which at its forward end is cylindrical and which as will be seen from Figures 5–8 gradually changes in cross-section and terminates (Figure 8) as wall portions one on each side of the forward end of the rearward fuselage part 21. Co-axially within the outer wall structure there is provided an inner wall structure 27 having at its forward end a conical portion 28 which projects forwardly beyond the outer wall structure 26 with its apex forwardly of an annular air intake 29 defined between the base of the conical portion 28 and the leading edge of the outer wall structure 26. Such a form of intake is considered desirable in case of aircraft designed for supersonic flight, the conical formation creating a shock wave formation (indicated at 30) which extends rearwardly from the apex of the conical portion 28 to lie outside the leading edge of the outer intake wall structure 26.

The conical portion 28 and the inner wall structure 27 rearwardly of it are coaxial with the outer wall structure 26 and the inner and outer wall structures 26, 27 define between them an annular air duct leading rearwards from the air intake 29, which intake duct is of increasing cross-sectional area in the direction of flow of air therethrough, so that diffusion occurs in the duct, the air speeds behind the shock wave formation 30 being subsonic. In the drawings the inner wall structure 27 tapers in the direction of air flow and the outer wall structure increases in internal diameter.

Beyond the rearward end of the annular air duct, there is installed in the outer wall structure a plurality of gas-turbine engines, say six engines, 31a, 31b, 31c, 31d, 31e, 31f. The engines are indicated diagrammatically and may be of any convenient type, say of the type having axial-flow compressors i. e. of the type in which the air flows directly into the compressor through a forward facing annular air entry. The engines 31a, 31b, 31c, 31d, 31e, 31f are arranged in a ring with their axes parallel and in the surface of a cylinder coaxial with the inner and outer wall structures 26, 27. The engines are arranged in juxtaposition so that their annular entries together form substantially an annulus which is a continuation of the rear end of the annular intake duct. By this arrangement, air enters the gas-turbine engine compressors without substantial deviation from the direction of flow of air in the annular intake duct. As indicated in Figure 5, the entries may be flared together to form a complete annulus.

The forward end of the rearward part 21 of the fuselage structure is joined to the forward part 20 in a manner (Figures 8 and 9) providing a pair of exhaust exit areas through which the gas-turbine engines 31a, 31b, 31c, 31d, 31e, 31f exhaust to atmosphere, there being one exit area on each side of the fuselage part 21. It is preferred that each of the gas-turbine engines 31a, 31b, 31c, 31d, 31e, 31f has a separate exhaust duct 32a, 32b, 32c, 32d, 32e, 32f so that a plurality of engines do not exhaust into a common exhaust duct.

In the illustrated embodiment, the exhaust gas flow from the engines may, when desired, be deflected downwardly with respect to the normal direction of flight by gas flow deflector means which comprise plate-like elements 33 arranged to be pivoted about hinge axes. In an arrangement in which as illustrated three engine exhausts 32a, 32b, 32c are on one side of the rearward fulselage part 21 and the remaining three exhausts 32d, 32e, 32f are on the other side, the exhaust ducts of each set of three engines are made of differing lengths and are disposed one above the other, the uppermost exhaust ducts 32a, 32f being given the greatest lengths, the exhaust ducts 32b, 32e being given an intermediate length, and the lowermost exhaust ducts 32c, 32d being given the shortest length, and the exhaust ducts are each cut off at an angle so that the ultimate outlets from the exhaust ducts are contained in a plane inclined rearwards from the lowermost edge of the set of exhaust ducts. One deflector plate element 33 is pivoted at the upper edge of each exhaust duct and when the plate elements are moved into the gas stream they deflect the stream downwardly, the total gas flow can be turned through 90°. A further plate element 33 is provided on the lower edge of each of the lowermost ducts 32c, 32d.

This arrangement for deflecting the gas flow can be used to assist in a take-off and landing of the aircraft, and may, in conjunction with a further engine installation 34 at the rear of the rearward part of the fuselage, allow the aircraft to partake of vertical flight with zero forward speed.

I claim:

1. A supersonic aircraft having an aerofoil structure and a fuselage structure including a forward part and a rearward part, the forward fuselage part comprising an outer wall structure of substantially tubular form, an inner wall structure arranged coaxially within the outer wall to form therewith an unobstructed, rearwardly-diverging, annular duct having a forwardly-facing, supersonic intake, a conical centre-body formed as a forward extension of said inner wall structure and with its apex disposed forwardly of the leading edge of said outer wall structure at such a position that any shock wave formation generated by the apex of said conical centre-body extends rearwardly from the apex as to pass outside the area of the intake, and a gas-turbine power-plant installation comprising a plurality of gas-turbine reaction-propulsion engines with forwardly-facing intakes arranged within said fuselage structure in annular formation directly rearwards of said annular duct to receive air therefrom without substantial deviation of the air flow, said engines having their longitudinal axes situated approximately on the mean centre-line of the annular duct and having their intakes together forming substantially an annulus of the same dimensions as the cross-section of said annular duct, and the rearward fuselage part comprising pilot accommodation and fuel tanks and having the aerofoil structure supportingly connected thereto, and the rearward fuselage part further having a forward end which defines with said outer wall structure a pair of exhaust duct means one on each side of said forward end and having rearwardly-facing outlet to atmosphere adjacent said forward end, the exhaust duct means on one side of said forward end of the rearward fuselage part having exhaust duct passages extending rearwards from a number of said engines and the exhaust duct means on the other side of said forward end of the rearward fuselage part having exhaust duct passages extending rearwards from the remainder of said engines to said outlets to atmosphere.

2. A supersonic aircraft as claimed in claim 1, wherein each exhaust duct means has a number of exhaust duct passages and outlets to atmosphere corresponding to the number of engines associated therewith.

3. An aircraft as claimed in claim 2, having six such reaction-propulsion engines in said annular formation, the engines having their axes parallel, and having three of said engines arranged to exhaust to atmosphere through exhaust ducting means arranged on one side of the fuselage structure and the remaining three of said engines to exhaust to atmosphere through exhaust duct means on the other side of the fuselage structure.

4. An aircraft as claimed in claim 3, wherein the exhaust duct means on each side of the fuselage comprises three superposed exhaust pipes, one for each of the associated engines.

5. A supersonic aircraft as claimed in claim 4, having the ends of the three exhaust pipes cut off at an angle so as to be contained in a plane inclined rearwardly with respect to the direction of flight, and further comprising a pivoted deflector plate associated with each exhaust pipe by means of which the exhaust gas stream from the exhaust pipe can be deflected downwardly with respect to the normal direction of flight of the aircraft.

6. A supersonic aircraft as claimed in claim 1, comprising also adjustable deflector means at the outlets of said exhaust duct means to enable the exhaust gases issuing through said outlets to be deflected downwardly with respect to the direction of normal flight of the aircraft thereby to produce a lift force on the aircraft.

7. A supersonic aircraft having an aerofoil structure and a fuselage structure including a forward part and a rearward part, the forward part comprising an outer tubular wall and a coaxial inner wall defining therebetween an annular duct diverging rearwardly from the inlet thereto, the inner wall having a conical forward extension having its apex forward of the leading edge of the outer wall, and a plurality of gas turbine engines arranged in annular formation directly rearwards of said duct to receive air therefrom, and the rearward part having the aerofoil structure supportingly connected thereto and comprising a forward end which defines with said outer wall structure a pair of exhaust duct means one on each side of said forward end and having rearwardly-facing outlets to atmosphere adjacent said forward end, each of said exhaust duct means being connected to at least one of said engines.

References Cited in the file of this patent
UNITED STATES PATENTS

| | | |
|---|---|---|
| 2,420,323 | Meyer et al. | May 13, 1947 |
| 2,601,194 | Whittle | June 17, 1952 |
| 2,613,749 | Price | Oct. 14, 1952 |
| 2,638,738 | Salter | May 19, 1953 |
| 2,638,740 | Sammons | May 19, 1953 |